United States Patent [19]
Johnson et al.

[11] Patent Number: 6,092,069
[45] Date of Patent: Jul. 18, 2000

[54] MARKET RESEARCH DATABASE CONTAINING SEPARATE PRODUCT AND NAKED PRODUCT INFORMATION

[75] Inventors: Barbara Elizabeth Johnson, Elk Grove Village; James Charles Martin, Grayslake; Kenneth Francis Rabolt, Cary, all of Ill.; Keri Anderson Healy, Bainbridge Island, Wash.; Danielle Anne Byron, Chicago, Ill.; Ilga Anita Berzkalns, Riga, Latvia

[73] Assignee: A.C. Nielsen Company, Schaumburg, Ill.

[21] Appl. No.: 08/994,924

[22] Filed: Dec. 19, 1997

[51] Int. Cl.[7] ....................................... G06F 17/30
[52] U.S. Cl. ................. 707/100; 705/1; 705/20; 705/26
[58] Field of Search ..................... 707/100, 103; 705/1, 14, 20, 26; 235/375; 395/611

[56] References Cited

U.S. PATENT DOCUMENTS

| | | | |
|---|---|---|---|
| 4,703,423 | 10/1987 | Bado et al. | 705/1 |
| 4,972,504 | 11/1990 | Daniel, Jr. et al. | 705/10 |
| 4,992,940 | 2/1991 | Dworkin | 705/26 |
| 5,256,863 | 10/1993 | Ferguson et al. | 380/24 |
| 5,313,392 | 5/1994 | Temma et al. | 705/27 |
| 5,600,565 | 2/1997 | Wagner et al. | 364/478.07 |
| 5,659,740 | 8/1997 | Ezaki et al. | 707/103 |
| 5,675,784 | 10/1997 | Maxwell et al. | 707/100 |
| 5,873,069 | 2/1999 | Reuhl et al. | 705/20 |
| 5,913,210 | 6/1999 | Call | 707/4 |

OTHER PUBLICATIONS

International Search Report, dated Jul. 16, 1999, Application No. PCT/US98/27036.

*Primary Examiner*—Hosain Alam
*Assistant Examiner*—Ella Colbert
*Attorney, Agent, or Firm*—Marshall, O'Toole, Gerstein, Murray & Borun

[57] ABSTRACT

A market research database includes industry code information containing industry codes (such as UPCs), naked product information containing information about naked products, package information containing information about packages, and product definition information linking naked product information, package information, and industry codes. Accordingly, the storage of information in the database is not dependent upon UPCs or other industry codes, making access to product related information difficult. The use of naked product information, together with the way of identifying products, facilitate a third normal form database.

64 Claims, 8 Drawing Sheets

PRODUCT DEFINITION 30

| PRODUCT ID | HIST CTL | HIST CNT CTL | PROD NAME | PACKAGE ID | NAKED PRODUCT ID | INDUSTRY CODE (e.g., UPC) | EFC DT | ... |
|---|---|---|---|---|---|---|---|---|
| ←60 | ←62 | ←64 | ←66 | ←68 | ←70 | ←72 | ←74 | |

FIGURE 3

PRODUCT CHARACTERISTICS 42

| PRODUCT ID | CHR TYP ID | CHR VL ID | HIST CTL | ... |
|---|---|---|---|---|
| ←80 | ←82 | ←84 | ←86 | |

FIGURE 4

PACKAGE DEFINITION

| PACKAGE ID | PACKAGE NAME | HIST CTL | HIST CNT CTL | EFT DATE | END DATE | PACK. DISC. |
|---|---|---|---|---|---|---|
| ← 90 | ← 92 | ← 94 | ← 96 | ← 98 | ← 100 | ← 102 |

FIGURE 5

PACKAGE CHARACTERISTICS

| PACKAGE ID | CHR TYP ID | CHR VL ID | HIST CTL |
|---|---|---|---|
| ← 110 | ← 112 | ← 114 | ← 116 |

FIGURE 6

NAKED PRODUCT

| NAKED PRODUCT ID | HIST CTL | HIST CNT CTL | NAKED PRODUCT NAME | BRAND ID | EFC DATE | ... |
|---|---|---|---|---|---|---|
| ↑ 120 | ↑ 122 | ↑ 124 | ↑ 126 | ↑ 128 | ↑ 130 | |

NAKED PRODUCT CHARACTERISTICS

| NAKED PRODUCT ID | CHR TYP ID | CHR VL ID | ... |
|---|---|---|---|
| ↑ 140 | ↑ 142 | ↑ 144 | |

BRAND NAME 38

| BRAND ID | BRAND NAME | BUSINESS ENTERPRISE ID | HIST CTL | HIST CNT CTL | EFC DATE | ... |
|---|---|---|---|---|---|---|
| ←150 | ←152 | ←154 | ←156 | ←158 | ←160 | |

FIGURE 9

BUSINESS ENTERPRISE 40

| BUSINESS ENTERPRISE ID | BUSINESS ENTERPRISE NAME | HIST CTL | HIST CNT CTL | EFC DATE | ... |
|---|---|---|---|---|---|
| ←170 | ←172 | ←174 | ←176 | ←178 | |

CHARACTERISTIC VALUE — 44

| CHR TYP ID | CHR VL ID | HIST CTL | HIST CNT CTL | EFC DATE | ... |
|---|---|---|---|---|---|
| ←180 | ←182 | ←184 | ←186 | ←188 | |

FIGURE 12

CHARACTERISTIC TYPE — 46

| CHR TYP ID | CHR TYP NAME | HIST CTL | HIST CNT CTL | EFC DATE | ... |
|---|---|---|---|---|---|
| ←190 | ←192 | ←194 | ←196 | ←198 | |

FIGURE 13

CHARACTERISTIC VALUE/TYPE — 48

| CHR VL ID | CHR VL | HIST CTL | HIST CNT CTL | EFC DATE | ... |
|---|---|---|---|---|---|
| ←200 | ←202 | ←204 | ←206 | ←208 | |

| BRAND ID | BRAND NAME | HIST CTL | HIST CNT CTL | EFC DATE |
|---|---|---|---|---|
| 1 | ABC | 0 | 1 | 1/1/97 |
| 1 | A BC | 1 | 0 | 1/1/96 |
| 1 | AB C | 2 | 0 | 1/1/95 |
| 2 | DEF | 0 | 1 | 4/1/97 |
| ↑212 | ↑214 | ↑216 | ↑218 | ↑220 |

MARKET RESEARCH DATABASE CONTAINING SEPARATE PRODUCT AND NAKED PRODUCT INFORMATION

TECHNICAL FIELD OF THE INVENTION

The present invention relates to a market research database containing information about products, the business enterprises that deal in the products, and/or the like.

BACKGROUND OF THE INVENTION

Information data models are used by database designers to model various environments. For example, information data models are used to model business environments in order to assure, inter alia, operational efficiency. The computer systems involved in modeling such an environment typically require complex computer-level manipulations, because the environment that is being modeled consists of many complex and interrelated objects. Such information systems exploit database management technology in order to promote efficient design, to enhance file maintenance and modification, to eliminate data file redundancy, and to provide substantial documentation regarding data file structure.

The implementation of an information management system utilizing database management technology typically involves the concept of at least dual data representations, i.e., logical representation and physical representation. A logical representation relates to the form in which data records are presented to, and interact with, the system user. A physical representation relates to the form in which individual data records are stored, and how the records are manipulated by the computer system. The physical representation of the data in the past has been regarded as of little or no concern to the end user because the task of manipulating data storage areas is a function of the system, and is established by system designers.

Disregard of the relationship between the physical representation of data and the end user has lead to databases which are difficult for the end user to use and manipulate. For example, market research databases are used to track the flow of products through one or more business enterprises and ultimately to an end user, such as a consumer. Such a database may be useful in determining the effective use of shelf space within a retailer, the effective use of advertising and other promotional campaigns, the effectiveness of distribution systems, the buying habits of consumers, retailers, wholesalers, and the like, and other information which can make manufacturers and distributors of products more efficient and profitable.

Databases which are used for market research and analysis contain information typically stored in flat files headed by uniform product codes (UPCs). Storing market research data in flat files headed by uniform product codes, however, has several problems. For example, uniform product codes are typically recycled so that a uniform product code that describes a particular product in one year may describe a different product in a later year. While the users of these uniform product codes are generally asked to wait a full year before a uniform product code is recycled, uniform product codes are frequently recycled within a year. Therefore, uniform product codes may overlap different products in terms of product related information that is stored in a market research database.

That is, when a product is discontinued, its associated uniform product code is discontinued for some period of time. After this period of time, the discontinued uniform product code may be recycled by associating it with a newly introduced product. However, it may be necessary to store information about both the discontinued product and the newly introduced product in a market research database because both products may still be in distribution (e.g., the discontinued product may still be on store shelves). Moreover, even after the discontinued product and the newly introduced product are no longer in distribution at the same time, distributors and others may want product related information about both. However, storing information about a discontinued product and a newly introduced product, where both are associated with the same uniform product code, presents difficult problems to the database user and/or designer.

Moreover, product related information storage needs frequently change. For example, changing needs often require the deletion or addition of fields. While the deletion of fields in flat data files of a market research database is not particularly difficult to implement, the deletion of fields in such flat data files can lead to an inefficient use of memory. Addition of fields in such a market research database, however, is very difficult to implement without changing the software that implements the database.

Also, it is often desirable to track and report the evolution of a product, a brand name, a business enterprise, and/or the like. Therefore, while many database systems store data in historical perspective, tracking the evolution of a product, a brand name, a business enterprise, and/or the like is difficult because of the way in which the data is stored. For example, it is known to use an additional code in connection with a uniform product code in order to identify the generation of a product. However, while this additional code may indicate that some aspect of a product has changed, it does little to designate the particular aspect of the product that has changed. To determine the changed aspect, the data stored in connection with the additional code must be closely examined and compared to the data associated with other generations of the same uniform product code in order to determine the changed aspect.

The present invention is directed to a market research database which solves one or more of the problems discussed above.

SUMMARY OF THE INVENTION

In accordance with one aspect of the present invention, a market research database comprises industry code information, naked product information, and product definition information. The industry code information includes industry codes. The naked product information links naked product codes and product definition codes. The product definition information links product definition codes, naked product codes, and industry codes.

In accordance with another aspect of the present invention, a market research database comprises first, second, and third information sets, and time related links. The first information set includes information about products. The second information set includes information about brands. The third information set includes information about business enterprises. The time related links are between the first, second, and third information sets, and the time related links are arranged to permit tracking of evolutionary relationships between the products, the brands, and the business enterprises.

In accordance with yet another aspect of the present invention, a market research database comprises first and second information sets and time related links. The first information set includes brand information. The second information set includes business enterprise information. The time related links are between the first and second information sets, and the time related links are arranged to permit tracking of evolutionary relationships between the brand information and the business enterprise information.

In accordance with a further aspect of the present invention, a market research database comprises first, second, third, and fourth information sets and time related links. The first information set includes product definition information. The second information set includes naked product information. The third information set includes brand information. The fourth information set includes business enterprise information. The time related links are between the first, second, third, and fourth information sets, and the time related links are arranged to permit tracking of evolutionary relationships between the product definition information, the naked product information, the brand information, and the business enterprise information.

BRIEF DESCRIPTION OF THE DRAWINGS

These and other features and advantages of the present invention will become more apparent from a detailed consideration of the invention when taken in conjunction with the drawings in which:

FIG. 3 illustrates a table containing the product definition information of FIG. 2;

FIG. 4 illustrates a table containing the product characteristic information of FIG. 2;

FIG. 5 illustrates a table containing the package information of FIG. 2;

FIG. 6 illustrates a table containing the package characteristic information of FIG. 2;

FIG. 7 illustrates a table containing the naked product information of FIG. 2;

FIG. 8 illustrates a table containing the naked product characteristic information of FIG. 2;

FIG. 9 illustrates a table containing the brand name information of FIG. 2;

FIG. 10 illustrates a table containing the business enterprise information of FIG. 2;

FIG. 11 illustrates a table containing the characteristic value/type information of FIG. 2;

FIG. 12 illustrates a table containing the characteristic type information of FIG. 2;

FIG. 13 illustrates a table containing the characteristic value information of FIG. 2; and, FIG. 14 illustrates an example useful in understanding the time links used to track evolutionary information with respect to the above tables.

DETAILED DESCRIPTION

Figure 1:
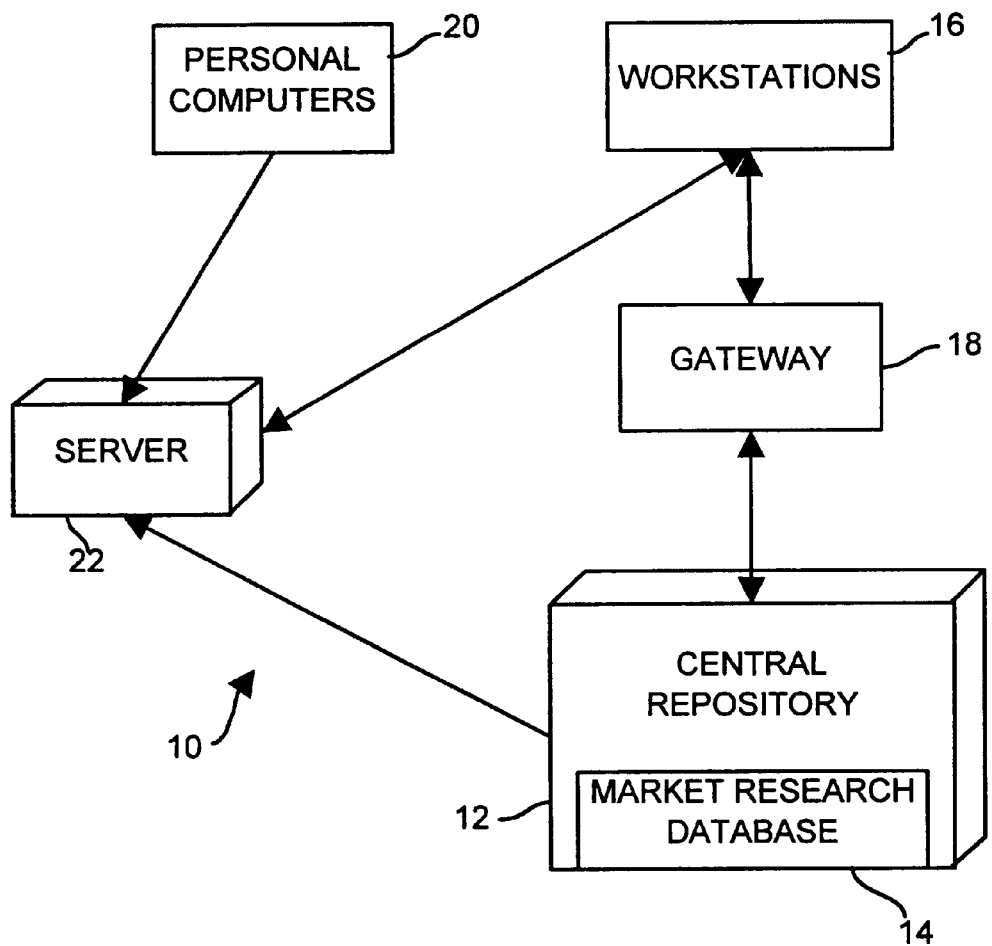
FIG. 1 is a block diagram of an exemplary data processing system in which the market research database of the present invention may be used.

As shown in FIG. 1, a data processing system 10 provides an exemplary environment for the market research database of the present invention and includes a central repository 12. The central repository 12 stores a market research database 14 which will be described in more detail below. A work station 16, operating through a gateway 18, is used for entering market research data into the market research database 14 and for reading market research information out of the market research database 14. Additional work stations may also be provided for these purposes. The work station 16 may be provided with a display in order to present the user of the data processing system 10 with various screen displays formatted for ease of data entry, data manipulation, and report generation. The work station 16 may further have a keyboard, a bar code scanner for scanning industry codes such as uniform product codes, an optical character recognition device, and/or the like.

Moreover, personal computers may be provided in order to collect data about products in the field. One such personal computer 20 is shown in FIG. 1. The personal computer 20 downloads its collected data to the central repository 12 through a server 22 under control of the work station 16. For example, the personal computer 20 can be used to collect market research data from various retail, wholesale, and/or other product outlet establishments regarding new products that have just become available.

Market research data may be stored in the market research database 14 in the form of tables which store groups of similar data. However, it should be understood that the market research data may be organized other than by tables. Accordingly, the organization of data in the market research database 14 may be generically referred to herein as information sets.

Figure 2:
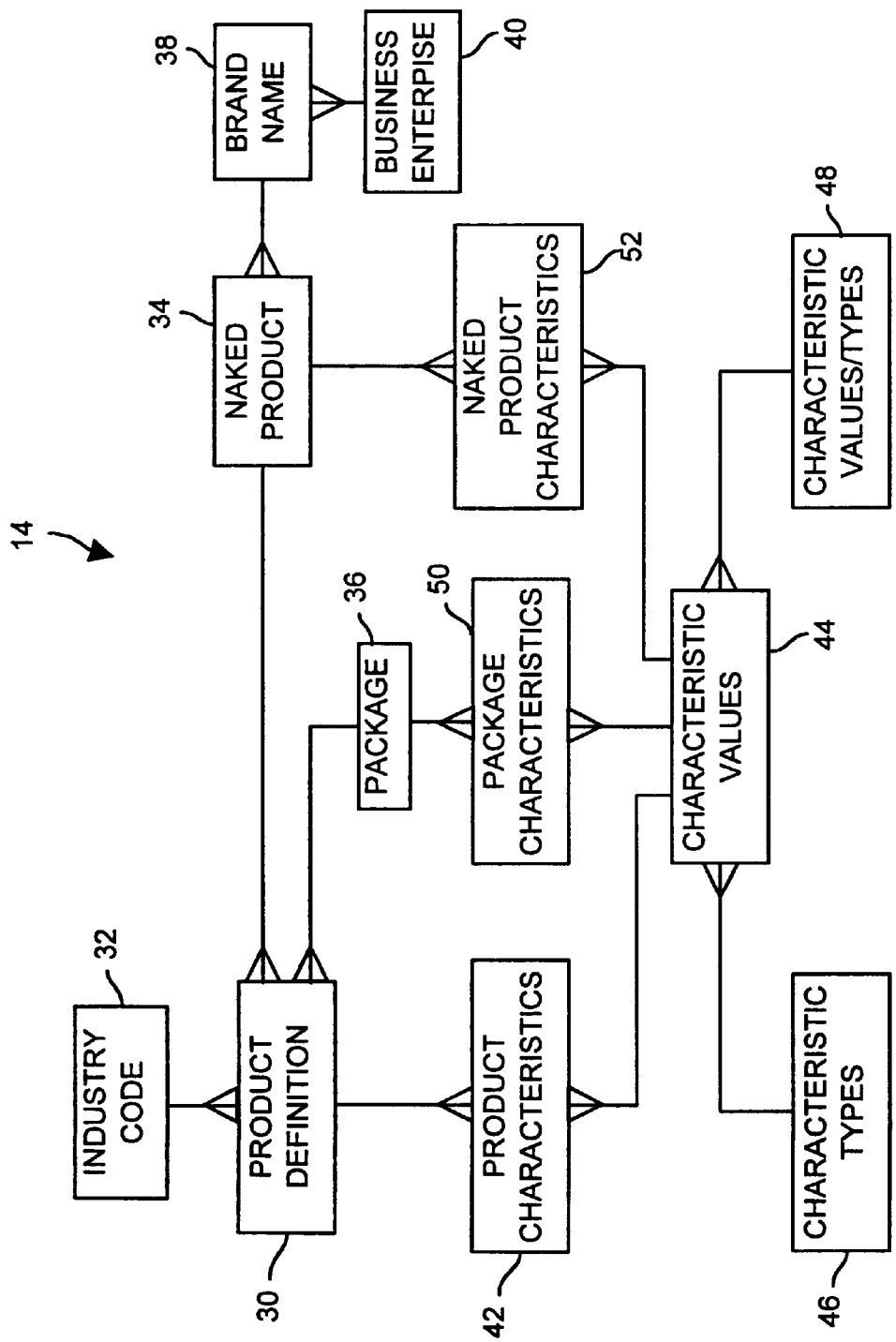
FIG. 2 is a block diagram of a market research database which is arranged in accordance with the present invention and which includes product definition information, product characteristic information, package information, package characteristic information, naked product information, naked product characteristic information, brand name information, business enterprise information, characteristic value/type information, characteristic type information, and characteristic value information.

As shown in FIG. 2, the market research database 14 includes various information which relates to various market aspects of products. For example, the market research database 14 includes a product definition table 30, a uniform product code table 32, a naked product table 34, a package definition table 36, a brand name table 38, a business enterprise table 40, a product characteristic role table 42, a characteristic value table 44, a characteristic type table 46, a characteristic value/type table 48, a package characteristic role table 50, and a naked product characteristic role table 52. Although the product characteristic role table 42, the package characteristic role table 50, and the naked product characteristic role table 52 are shown as tables containing certain information as discussed below, it should be understood that this information is role information and instead may be scattered throughout other tables of the market research database 14.

The product definition table 30 stores product definition codes which, like uniform product codes, are used to designate corresponding products that are defined according to links also stored in the product definition table 30 of the market research database 14. These product definition codes function to divorce products and their product related information from the products' uniform product codes. Accordingly, a product definition code is permanently assigned to the product and is used throughout the market research database 14, where appropriate, to designate the product and to provide a link to the information about the product stored in other tables of the market research database 14. A product definition code is assigned to a product the first time that any information about the product is stored in the market research database 14, and is not recycled as are uniform product codes.

However, in order to facilitate the entry of data into the market research database 14, the product definition code stored in the product definition table 30 is linked, where applicable, to a corresponding uniform product code which is stored in the uniform product code table 32. Thus, for example, if a new product is introduced into the market and has been assigned a new uniform product code, that new uniform product code can be scanned by the personal computer 20 and relevant information about the product as contained in that new uniform product code can be populated into the relevant tables of the market research database 14 (for example, under control of a set of rules). Additional product related information can be manually entered.

However, if a uniform product code is recycled, the old product formerly associated with it can remain in the market research database 14 under its original product definition code, and a new product definition code is assigned to the new product that is designated by the recycled uniform product code. Thus, the old link between the product definition code for the old product and the uniform product code is moved to a historical layer, and a new link between the new product definition code and the recycled uniform product code is established in a current layer. As a result, information about the old and new products may be maintained in the market research database 14 at the same time in a simple and non-confusing manner. Moreover, because products, and information about the products, have been divorced from their corresponding uniform product codes, recycling of uniform product codes does not require substantial changes to the information stored in the market research database 14.

As product related information is entered into the market research database 14, this product related information can be viewed on the display of the work station 16 so that any erroneous information may be corrected and so that additional information may be entered.

The product definition table 30 links the product definition codes stored therein with product related information which defines the products designated by the product definition codes and which is stored in other tables. For example, the naked product table 34 contains information about naked products. That is, most of us think of a product as the combination of a package and a substance contained within the package. The substance, absent its package, is referred to herein as a naked product.

For example, the naked product table 34 might contain cola as an item of information, whereas the product definition table 30 has links between cola, as stored in the naked product table 34, and other product related information such as a package, a size, and the like, stored in other tables. Put together, the naked product, and the other information, linked to a product definition code of the product definition table 30, define a product as is commonly understood by the consumer.

Thus, the product definition table 30 is also linked to the package definition table 36 which contains definitions of various packages which are or have been used to enclose naked products in order to form products. The naked product table 34 has links to the brand name table 38 which contains brand names of products. Because several naked products may have a brand name associated with them, each brand name stored in the brand name table 38 may be linked to multiple naked products stored in the naked product table 34. The brand name table 38 is linked to the business enterprise table 40. Each business enterprise stored in the business enterprise table 40 may be associated with plural brand names stored in the brand name table 38. For example, the business enterprise table 40 may contain business enterprises which package, wholesale, and retail a brand name, and so on.

The product definition table 30 is linked to the product characteristic role table 42. The primary function of the product characteristic role table 42 is to link product definition codes stored in the product definition table 30 to various characteristic types and values. Accordingly, the product characteristic role table 42 links the product definition table 30 to a characteristic value table 44, and the characteristic value table 44 contains links to the characteristic type table 46 and the characteristic value/type table 48. Thus, a definition of a product is partially completed by the characteristic types of the characteristic type table 46 to which the product is linked and by the characteristic values of the characteristic value/type table 48 to which the product is also linked.

The characteristic type table 46 contains characteristic type information such as flavor, size, color, and the like. The characteristic value/type table 48 contains values of the characteristic types stored in the characteristic type table 46. For example, the characteristic value/type table 48 may store grape, orange, cherry, and the like as values of the type "flavor" stored in the characteristic type table 46, 12 ounces, 5 pounds, 1 liter, and the like as values of the type "size" stored in the characteristic type table 46, and red, green, blue, and the like as values of the type "color" stored in the characteristic type table 46.

Similarly, the package characteristic role table 50 links package codes stored in the package definition table 36 to characteristic value/type codes stored in the characteristic value table 44 (package codes are also linked to product definition codes in the product definition table 30). The primary function of the package characteristic role table 50 is to link package codes stored in the package definition table 36 to various characteristic types and values. Accordingly, the package characteristic role table 50 links the package definition table 36 to the characteristic value table 44, and the characteristic value table 44 contains links to the characteristic type table 46 and the characteristic value/type table 48. Thus, a definition of a package is completed by the characteristic types of the characteristic type table 46 to which the package is linked, and by the characteristic values of the characteristic value/type table 48 to which the package is also linked. For example, a package may be defined in terms of characteristic types such as aluminum can, cardboard box, and the like, and in terms of characteristic values such as the size of the container.

The naked product characteristic role table 52 links naked product codes stored in the naked product table 34 to characteristic value/type codes stored in the characteristic value table 44. In turn, the characteristic value table 44 contains links to the characteristic type table 46 and the characteristic value/type table 48. Thus, the naked product characteristic role table 52 links naked product codes stored in the naked product table 34 to characteristic value/type codes stored in the characteristic value table 44, and the characteristic value/type codes stored in the characteristic value table 44 are linked to characteristic types stored in the characteristic type table 46 and to characteristic values stored in the characteristic value/type table 48. Thus, the naked product cola may be defined in terms of a characteristic type such its color and in terms of certain characteristic values such as brown.

As can be seen from FIG. 2, the market research database 14 is a database in third normal form as opposed to, for example, flat data files of current market research databases. Thus, instead of a flat file consisting of a string of information including a uniform product code, a package, brand names, business enterprises, and the like, the market research database 14 is broken up into various information sets each containing similar product related information and each containing links to product related information contained in other information sets. The definition of a product is created in the product definition table 30 by providing the beginning links which, in combination with the links in other information tables, define each particular product.

The third normal form of the market research database 14 makes the addition of information much easier than if the market research database 14 were stored as flat data files. In essence, each of the tables 30–56 shown in FIG. 2 is depthless in the sense that information can be added to each of these information tables without defining new fields and the like inherent with flat data files. Moreover, although particular tables 30–56 have been described in connection with the market research database 14, it should be understood that the market research database 14 may include different, fewer, or more tables than those specifically shown in FIG. 2. Furthermore, each of the tables 30–56 shown in FIG. 2 may be combined with others of the shown tables or may be separated into additional sub-tables. However, it should be noted that combining the tables 30–56 tends to cause the market research database 14 to retreat from its third normal form, making the market research database 14 more complex to maintain.

The product definition table 30 is shown in more detail in FIG. 3. The product definition table 30 includes a product definition code column 60 in which are stored the product definition codes of the various products contained within the market research database 14. The product definition codes, as well as any of the other codes discussed herein, may be any combination of alphabetical, numeric, and/or other symbols. For each product definition code stored in the product definition code column 60, a historical control designator is stored in a historical control column 62. In essence, the historical control designators stored in the historical control column 62 define time layers of product related information. The historical control designator indicating the current time layer of information in the market research database 14 may be referred to herein as the current historical control designator. This current time layer provides the definitions of products currently in effect. Those historical control designators, which designate layers of information in the market research database 14 prior to the current time layer of information, may be referred to as previous historical control designators. Thus, a product definition code stored in the product definition code column 60 may have several entries in the product definition code column 60, with each such entry having a different historical control designator. One such entry may relate to one definition of a product, another such entry may relate to another definition of the product, and so on. Accordingly, a product may be tracked as its brand name, package, uniform product code, related business enterprises, and/or the like changes. If a user wishes to determine any current or previous definition of one or more products, the user may use the historical control designator in order to extract information from the market research database 14 which defines such product or products at the current or previous time period.

Moreover, the historical control designator assigned to the current time layer of information stored in each of the other tables of the market research database 14 may be identical to the historical control designator assigned to the current time layer of information stored with the product definition table 30 so that the current time layer of information across the entire market research database 14 may be easily determined.

Each product definition code as stored in the product definition table 30 also has associated therewith a historical counter control designator stored in a historical counter control column 64 (which designates the number of historical layers in the relevant table), a product name stored in a product name column 66, a package code stored in a package code column 68, a naked product code stored in a naked product column 70, a uniform product code stored in a uniform product code column 72, and an effective date stored in an effective date column 74. The product definition table 30 may include different information, or other information, such as an end date on which a particular product definition code and its associated product name, package code, and/or the like was ended, a product description, which is a text description of a particular product, and the like.

The product names stored in the product name column 66 may be different from the brand names of the products, and may instead be short titles which are intended to be at least somewhat descriptive of the products defined in the product definition table 30. The package codes stored in the package code column 68 provide links between the product definition codes stored in the product definition code column 60 of the product definition table 30 and package codes stored in the package definition table 36 of the market research database 14. The naked product codes stored in the naked product column 70 link the product definition codes stored in the product definition code column 60 of the product definition table 30 with naked product codes stored in the naked product table 34. The uniform product codes stored in the uniform product column 72 link the product definition codes stored in the product definition code column 60 with uniform product codes stored in the uniform product code table 32.

The effective dates stored in the effective date column 74 are used to indicate the effective dates of corresponding combinations of product definition codes stored in the product definition code column 60, historical control designators stored in the historical control column 62, historical counter control designators stored in the historical counter control column 64, product names stored in the product name column 66, package codes stored in the package code column 68, naked product codes stored in the naked product column 70, and uniform product codes stored in the uniform product code column 72. Thus, the dates on which product definition codes are defined or redefined in terms of their product names, their packages, their naked products, their uniform product codes, and/or the like may be determined from the effective date column 74.

The product characteristic role table 42 is shown in more detail in FIG. 4 and includes a product definition code column 80 which links a particular product definition stored in the product definition table 30 as designated by its product definition code with a characteristic type code stored in a characteristic type code column 82, a characteristic value code stored in a characteristic value code column 84, a historical control designator stored in a historical control designator column 86, and the like. Thus, as discussed above, the product characteristic role table 42 links products as defined in the product definition table 30 to characteristic value/type codes stored in the characteristic value table 44.

The historical control column 86 stores historical control designators which permit the evolution of product characteristics associated with particular products to be easily tracked.

The package definition table 36 is shown in more detail in FIG. 5. The package definition table 36 includes a package code column 90 in which package codes associated with various packages may be stored. For each package code stored in the package code column 90, a package name is stored in a package name column 92, a historical control designator is stored in a historical control column 94, a historical counter control designator is stored in a historical counter control column 96, an effective date is stored in an effective date column 98, an end date is stored in an end date column 100, and a package description is stored in a package description column 102. The package definition table 36 may include different or other information as well.

The package names stored in the package name column 92 may be short titles which are intended to be at least somewhat descriptive of the packages defined in the package definition table 36. As in the case of the historical control designators stored in other tables, the historical control designators stored in the historical control column 94 define time layers in the package definition table 36. Thus, a package code may have several entries in the package code column 90 with each such entry having a different historical control designator. One such entry may relate to one definition of a package, another such entry may relate to another definition of the package, and so on.

The package codes stored in the package code column 90 of the package definition table 36, and the package codes stored in the package code column 68 of the product definition table 30, act as links between the product definitions stored in the product definition table 30 and package definitions stored in the package definition table 36 of the market research database 14. The effective dates stored in the effective date column 98 are used to indicate the effective dates of corresponding combinations of package codes stored in the package code column 90, package names stored in the package name column 92, historical control designators stored in the historical control column 94, historical counter control designators stored in the historical counter control column 96, and the like. Thus, the dates on which package codes are defined or redefined in terms of their package names and/or the like may be determined from the effective date column 98.

Because a particular package may evolve through time, there may be several entries in the package definition table 36 headed by the same package code in the package code column 90. The current definition of a package can be is determined from the unique current historical control designator stored in the historical control designator column 94. The effective date of a package definition may be determined from the effective date column 98, the end date of a particular package definition may be determined from the end date column 100, and a description of a package definition may be determined from the package description column 102.

The package characteristic role table 50 is shown in more detail in FIG. 6 and includes a package code column 110 which provides links between package definitions stored in the package definition table 36 and characteristic type codes stored in a characteristic type code column 112, characteristic value codes stored in a characteristic value code column 114, historical control designators stored in a historical control designator column 116, and the like. Thus, the package characteristic role table 50 links package definitions associated with package codes stored in the package definition table 36 to characteristic value/type codes stored in the characteristic value table 44. The historical control column 116 stores historical control designators which permit the evolution of package characteristics associated with particular packages to be easily tracked.

The naked product table 34 is shown in more detail in FIG. 7. The naked product table 34 includes a naked product code column 120 in which naked product codes associated with various naked products may be stored. For each naked product code stored in the naked product code column 120, a historical control designator is stored in a historical control column 122, a historical counter control designator is stored in a historical counter control column 124, a naked product name is stored in a naked product name column 126, a brand name code is stored in a brand name code column 128, and an effective date is stored in an effective date column 130. As in the case of the other tables of the market research database 14, the naked product table 34 may include other columns such as a naked product description column for providing a description of each of the naked products stored in the naked product table 34.

As in the case of historical control designators stored in other tables, the historical control designators stored in the historical control column 122 define time layers in the naked product table 34. Thus, a naked product code may have several entries in the naked product code column 120 with each such entry having a different historical control designator. One such entry may relate to one definition of a naked product, another such entry may relate to another definition of the naked product, and so on. The naked product names stored in the naked product name column 126 may be short titles which are intended to be at least somewhat descriptive of the naked products defined in the naked product table 34.

The naked product codes stored in the naked product code column 120 of the naked product table 34 and the naked product codes stored in the naked product code column 70 of the product definition table 30 link the product definitions of the product definition table 30 and the naked products stored in the naked product table 34 of the market research database 14. The effective dates stored in the effective date column 130 are used to indicate the effective dates of corresponding combinations of naked product codes stored in the naked product code column 120, historical control designators stored in the historical control column 122, historical counter control designators stored in the historical counter control column 124, naked product names stored in the naked product name column 126, brand names stored in the brand name column 128, and the like. Thus, the date on which a naked product code is defined or redefined in terms of its naked product name, brand name, and/or the like may be determined from the effective date column 130.

As shown in FIGS. 2, 3, and 7, each product as defined in the product definition table 30 may be linked to a brand name stored in the brand name table 38 through the naked product table 34. Thus, a brand name may be linked to a product definition stored in the product definition table 30 by its brand name code stored in both the naked product table 34 and the brand name table 38 and by corresponding naked product codes stored in both the product definition table 30 and the naked product table 34. It should be understood, however, that brand names may be linked to product definitions stored in the product definition table 30 by other mechanisms, such as a brand name column added to the product definition table 30. However, as discussed above, such a combination of tables retreats from the third normal form of the market research database 14.

The naked product characteristic role table 52 is shown in more detail in FIG. 8 and includes a naked product code column 140 which links a particular naked product stored in the naked product table 34 with a characteristic type code stored in a characteristic type code column 142, and a characteristic value code stored in a characteristic value code column 144. Thus, the naked product characteristic role table 52 links naked products stored in the naked product table 34 to characteristic value/type codes stored in the characteristic value table 44. The naked product characteristic role table 52 may include other columns, in addition to those shown in FIG. 8, such as a historical control column which may include a unique current historical control designator to designate the current time layer of information stored in the naked product characteristic role table 52.

The brand name table 38 is shown in more detail in FIG. 9. The brand name table 38 includes a brand name code column 150 in which brand name codes associated with various brand names may be stored. For each brand name code stored in the brand name code column 150, a brand name is stored in a brand name column 152, a business enterprise code is stored in a business enterprise code column 154, a historical control designator is stored in a historical control column 156, a historical counter control designator is stored in a historical counter control column 158, and an effective date is stored in an effective date column 160. As in the case of the other tables of the market research database 14, the brand name table 38 may include different or other columns containing different or other information.

As in the case of historical control designators stored in other tables, the historical control designators stored in the historical control column 156 define time layers in the brand name table 38, and the evolution of a brand name as stored in the brand name table 38 may be followed through the use of the historical control designators stored in the historical control column 156 and/or the effective dates stored in the effective date column 160. Thus, a brand name code may have several entries in the brand name code column 150, with each such entry having a different historical control designator. The brand names stored in the brand name column 126 are actual brand names and are identified by the brand name codes in the brand name table 34.

The brand name codes stored in the brand name code column 150 of the brand name table 38 match brand name codes stored in the business enterprise table 40 in order to link business enterprises of the business enterprises table 40 with brand names stored in the brand name table 38 of the market research database 14. The effective dates stored in the effective date column 160 are used to indicate the effective dates of corresponding combinations of brand name codes stored in the brand name code column 150, brand names stored in the brand name column 152, business enterprise codes stored in the business enterprise code column 154, historical control designators stored in the historical control column 156, and historical counter control designators stored in the historical counter control column 158, and the like. Thus, the dates on which a brand name code is defined and/or redefined in terms of its brand name, business enterprise, and/or the like may be determined from the effective date column 160.

As shown in FIGS. 2, 3, 7, and 9, each product as defined in the product definition table 30 may be linked to a business enterprise name stored in the business enterprise table 40 through the naked product table 34 and the brand name table 38. It should be understood, however, that business enterprise names may be linked to product definitions stored in the product definition table 30 by other mechanisms, such as a business enterprise name column added to the product definition table 30.

The business enterprise table 40 is shown in more detail in FIG. 10. The business enterprise table 40 includes a business enterprise code column 170 in which business enterprise codes associated with various business enterprises may be stored. For each business enterprise code stored in the business enterprise code column 170, a business enterprise name is stored in a business enterprise name column 172, a historical control designator is stored in a historical control column 174, a historical counter control designator is stored in a historical counter control column 176, and an effective date is stored in an effective date column 178. The business enterprise table 38 may include different or other columns containing different or other information.

As in the case of historical control designators stored in other tables, the historical control designators stored in the historical control column 174 define time layers in the business enterprise table 40, and the evolution of a business enterprise as stored in the business enterprise table 40 may be followed through the use of the historical control designators stored in the historical control column 174 and/or the effective dates stored in the effective date column 178. Thus, a business enterprise code may have several entries in the business enterprise code column 170, with each such entry having a different historical control designator. The business enterprise names stored in the business enterprise name column 172 are actual business enterprise names and are identified by the business enterprise codes in the business enterprise table 40.

The effective dates stored in the effective date column 178 are used to indicate the effective dates of corresponding combinations of business enterprise codes stored in the business enterprise code column 170, business enterprise names stored in the business enterprise name column 172, historical control designators stored in the historical control column 174, historical counter control designators stored in the historical counter control column 176, and the like. Thus, the dates on which a business enterprise code is defined or redefined in terms of its business enterprise name and/or the like may be determined from the effective date column 178.

The characteristic value table 44 is shown in more detail in FIG. 11. The characteristic value table 44 includes characteristic type codes stored in a characteristic type code column 180, characteristic value codes stored in a characteristic value code column 182, historical control designators stored in a historical control column 184, historical counter control designators stored in a historical counter control column 186, and effective dates stored in an effective date column 188. The characteristic value table 44 may include different or other columns containing different or other information.

Accordingly, the characteristic type codes and the characteristic value codes stored in the characteristic value table 44 link the product definition codes stored in the product characteristic role table 42, the naked product codes stored in the naked product characteristic role table 52, and the package codes stored in the package characteristic role table 50 with characteristic types and characteristic values stored in the characteristic type table 46 and the characteristic value/type table 48.

The evolution of characteristic value/type codes may be tracked through the historical control designators stored in the historical control designator column 184 and/or the effective dates stored in the effective date column 188.

The characteristic type table 46 is shown in more detail in FIG. 12. The characteristic type table 46 includes characteristic type codes stored in a characteristic type code column 190, characteristic type names stored in a characteristic type name column 192, historical control designators stored in a historical control column 194, historical counter control designators stored in a historical counter control column 196, and effective dates stored in an effective date column 198. The characteristic type table 46 may include different or other columns containing different or other information.

Accordingly, each characteristic type name, such as flavor, size, color, and the like, as stored in the characteristic type name column 192, is associated with a characteristic type code stored in the characteristic type column 190, and with historical control designators stored in the historical control column 194, historical counter control designators stored in the historical counter control column 196, and effective dates stored in the effective date column 198. The characteristic type codes provide the links between these characteristic type names and the product definitions stored in the product definition table 30, the package definitions stored in the package definition table 36, and the naked products stored in the naked product table 34.

The characteristic value/type table 48 is shown in more detail in FIG. 13. The characteristic value/type table 48 includes characteristic value codes stored in a characteristic value code column 200, characteristic values stored in a characteristic value column 202, historical control designators stored in a historical control column 204, historical counter control designators stored in a historical counter control column 206, and effective dates stored in an effective date column 208. The characteristic value/type table 48 may include different or other columns containing different or other information.

Accordingly, each characteristic value, such as 12 ounces, 5 pounds, 1 liter, and the like, as stored in the characteristic value column 202, is associated with a characteristic value code stored in the characteristic value column 200 and with historical control designators stored in the historical control column 204, historical counter control designators stored in the historical counter control column 206, and effective dates stored in the effective date column 208. The characteristic value codes provide the links between these characteristic values and the product definitions stored in the product definition table 30, the package definitions stored in the package definition table 36, and the naked products stored in the naked product table 34.

The usefulness of historical control designators and/or effective dates may be understood in connection with FIG. 14. As shown in FIG. 14, a brand name table 210 includes a brand name code column 212 for storing brand name codes, a brand name column 214 for storing brand names associated with the brand name codes, a historical control column 216 for storing historical control designators associated with the brand name codes, a historical counter control column 218 for storing historical counter control designators, an effective date column 220 for storing effective dates associated with the brand name codes, and/or the like. In the example of FIG. 14, one brand name code having a value of 1 has associated with it three different brand names. Thus, over the life of a particular product contained in the product definition table 30, the product had three different brand names. The current brand name, which was put into effect on Jan. 1, 1997 is ABC. The current brand name is associated with a historical control designator having a value of zero indicating that the current brand name ABC is at the current time layer of the information stored in the brand name table 210. Prior to the brand name ABC, the product had the brand name A BC which was put into effect on Jan. 1, 1996 and which was stopped being used on Jan. 1, 1997. The historical control designator for A BC has a value of 1 indicating that the brand name A BC was in a layer of information prior to the current time layer of information in the brand name table 210. Furthermore, prior to the use of the brand name A BC, the product was associated with the brand name AB C and has a historical control designator having a value of 2 associated therewith. This brand name AB C was put into effect on Jan. 1, 1995 and was stopped being used on Jan. 1, 1996.

A second brand name (i.e., DEF) associated with a second brand name code, having a value of 2, is shown in the brand name table 210. This brand name was put into effect on Apr. 1, 1997 and has a historical control designator having a value of zero indicating that this brand name is at the current time layer of information in the brand name table 210.

The use of the historical control designators in the historical control column 216 as shown in FIG. 14 and/or effective dates stored in the effective date column 220 is similar to the use of the historical control designators in the historical control columns and/or effective dates in the effective date columns of other tables in the market research database 14. If a user desires a report which includes information in the current time layer of information of the market research database 14, the user looks for all relevant information having a historical control designator of zero. On the other hand, the evolution of a brand name, a business enterprise, a product name, an industry code, a naked product or some other product related aspect of the market research database may be traced using the appropriate historical control designators and/or the effective dates. For this purpose, the effective dates either alone or in combination with the historical control designators may be referred to herein as redefine dates.

The package codes stored in the package definition table 36 and in the product definition table 30, and the characteristic type codes and characteristic value codes stored in the package characteristic role table 50 and the characteristic value table 44, are the links to the characteristic types and characteristic values stored in the characteristic type table 46 and the characteristic value/type table 48 which define a package that, in turn, help to define a product of the product definition table 30.

Similarly, the naked product codes stored in the naked product table 34 and in the product definition table 30, and the characteristic type codes and characteristic value codes stored in the naked product characteristic role table 52 and the characteristic value table 44, are the links to the characteristic types and characteristic values stored in the characteristic type table 46 and the characteristic value/type table 48 which define a naked product that, in turn, also helps to define a product of the product definition table 30.

Moreover, the naked product codes stored in the naked product table 34 and in the product definition table 30, and the brand name codes stored in the naked product 34 and the brand name table 38, are the links to the brand names stored in the brand name table 38 that further help to define a product of the product definition table 30.

Additionally, the naked product codes stored in the naked product table 34 and in the product definition table 30, the brand name codes stored in the naked product 34 and the brand name table 38, and the business enterprise codes stored in the brand name table 38 and the business enterprise table 40, are the links to the business enterprises stored in the business enterprise role table 50 that move the products of the product definition table 30 through their distribution chains.

Certain modifications of the present invention have been discussed above. Other modifications will occur to those practicing in the art of the present invention. For example, while the present invention has been described above in relation to uniform product codes, a uniform product is only one example of the type of industry code that may be used in connection with the present invention. Therefore, it should be understood that the present invention is useful in connection with any type of industry code.

Also, FIG. 1 illustrates the data processing system 10 as an exemplary data processing system which may be used to store and access market research data in the market research database 14. However, it should be understood that other data processing systems may be used to store and access market research data in the market research database 14.

Furthermore, a code, such as used herein in connection with product definition codes, naked product codes, brand name codes, business enterprise codes, package codes, characteristic value/type codes, characteristic type codes, and characteristic value codes, can be any alphabetical, numeric, alphanumeric, or other symbol or set of symbols or ID.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A market research database comprising:
   industry code information including industry codes;
   naked product information linking naked product codes and naked product definition codes, wherein a naked product code is a code related to a naked product, and wherein a naked product is a substance absent a package; and,
   product definition information linking product definition codes, naked product codes, and industry codes.

2. The market research database of claim 1 wherein the product definition information links product definition codes with characteristic codes.

3. The market research database of claim 2 further comprising characteristic information linking characteristic codes with product characteristics.

4. The market research database of claim 1 further comprising characteristic information linking product definition codes with characteristic types.

5. The market research database of claim 1 further comprising characteristic information linking product definition codes with characteristic values.

6. The market research database of claim 1 wherein the product definition information links naked product definition codes and product characteristics.

7. The market research database of claim 1 further comprising characteristic information linking naked product codes with characteristic types.

8. The market research database of claim 1 further comprising characteristic information linking naked product codes with characteristic values.

9. The market research database of claim 1 further comprising package information including package codes, wherein the product definition information links product definition codes with package codes.

10. The market research database of claim 9 wherein the package information links package codes with characteristic codes.

11. The market research database of claim 10 wherein the naked product information links naked product codes with characteristic codes.

12. The market research database of claim 11 further comprising characteristic information linking characteristic codes with characteristic types and values.

13. The market research database of claim 10 wherein the product definition information links product definition codes with characteristic codes.

14. The market research database of claim 13 further comprising characteristic information linking characteristic codes with characteristic types and values.

15. The market research database of claim 13 wherein the naked product information links naked product codes with characteristic codes.

16. The market research database of claim 15 further comprising characteristic information linking characteristic codes with characteristic types and values.

17. The market research database of claim 9 wherein the package information links package codes with characteristic types and values.

18. The market research database of claim 1 further comprising characteristic information linking package codes with characteristic types.

19. The market research database of claim 1 further comprising characteristic information linking package codes with characteristic values.

20. The market research database of claim 1 further comprising brand name information linking brand name codes, to product definition codes.

21. The market research database of claim 20 wherein the brand name codes are linked to the product definition codes through the naked product codes.

22. The market research database of claim 20 further comprising package information including package codes, wherein the product definition information links product definition codes with package codes.

23. The market research database of claim 22 wherein the package information links package codes with characteristic codes.

24. The market research database of claim 23 further comprising characteristic information linking characteristic codes with characteristic types and values.

25. The market research database of claim 23 wherein the naked product information links naked product codes with characteristic codes.

26. The market research database of claim 25 further comprising characteristic information linking characteristic codes with characteristic types and values.

27. The market research database of claim 23 wherein the product definition information links product definition codes with characteristic codes.

28. The market research database of claim 27 further comprising characteristic information linking characteristic codes with characteristic types and values.

29. The market research database of claim 27 wherein the naked product information links naked product codes with characteristic codes.

30. The market research database of claim 29 further comprising characteristic information linking characteristic codes with characteristic types and values.

31. The market research database of claim 20 wherein the product definition information links product definition codes with characteristic codes.

32. The market research database of claim 31 further comprising characteristic information linking characteristic codes with characteristic types and values.

33. The market research database of claim 20 wherein the naked product information links naked product codes with characteristic codes.

34. The market research database of claim 33 further comprising characteristic information linking characteristic codes with characteristic types and values.

35. The market research database of claim 1 further comprising business enterprise information linking business enterprise codes with product definition codes.

36. The market research database of claim 35 further comprising brand name information linking brand name codes with product definition codes.

37. The market research database of claim 36 wherein the brand name codes are linked with product definition codes through naked product codes, and wherein the business enterprise codes are linked with product definition codes through brand name codes and naked product codes.

38. The market research database of claim 36 further comprising package information linking package codes with product definition codes.

39. The market research database of claim 38 wherein the package information links package codes with characteristic codes.

40. The market research database of claim 35 further comprising package information linking package codes with product definition codes.

41. The market research database of claim 40 wherein the package information links package codes with characteristic codes.

42. The market research database of claim 35 wherein the naked product information links naked product codes with product definition codes.

43. The market research database of claim 42 wherein the naked product information links naked product codes with characteristic codes.

44. The market research database of claim 35 wherein the product definition information links product definition codes with characteristic codes.

45. The market research database of claim 1 further comprising time dependent links so that product related information may be tracked through time.

46. The market research database of claim 1 wherein the product definition information includes time dependent links to naked products and product characteristics so that product related information may be tracked through time.

47. The market research database of claim 1 wherein the product definition information includes a first product name and a second product name, and further comprising redefine information linking the first and second product names with a product redefine date on which the first product name was changed to the second product name.

48. The market research database of claim 1 wherein the industry code information includes a first industry code and a second industry code, and further comprising redefine information linking the first and second industry codes with a code redefine date on which the first industry code was changed to the second industry code.

49. The market research database of claim 1 wherein the naked product information includes a first naked product and a second naked product, and further comprising redefine information linking the first and second naked products with a naked product redefine date on which the first naked product was changed to the second naked product.

50. The market research database of claim 1 further comprising:
   brand name information including a first brand name and a second brand name; and,
   redefine information linking the first and second brand names with a brand name redefine date on which the first brand name was changed to the second brand name.

51. The market research database of claim 1 further comprising:
   business enterprise information including a first business enterprise and a second business enterprise; and,
   redefine information linking the first and second business enterprises with a business enterprise redefine date on which the first business enterprise was changed to the second business enterprise.

52. The market research database of claim 1 wherein the product definition information includes a first product name and a second product name, wherein the industry code information includes a first industry code and a second industry code, wherein the naked product information includes a first naked product and a second naked product, and wherein the market research database further comprises:
   brand name information including a first brand name and a second brand name;
   business enterprise information including a first business enterprise and a second business enterprise; and,
   redefine information (i) linking the first and second product names with a product redefine date on which the first product name was changed to the second product name, (ii) linking the first and second industry codes with a code redefine date on which the first industry code was changed to the second industry code, (iii) linking the first and second naked products with a naked product redefine date on which the first naked product was changed to the second naked product, (iv) linking the first and second brand names with a brand name redefine date on which the first brand name was changed to the second brand name, and (v) linking the first and second business enterprises with a business enterprise redefine date on which the first business enterprise was changed to the second business enterprise.

53. The market research database of claim 52 wherein the brand names are linked to naked products, and wherein business enterprises are linked to brand names.

54. The market research database of claim 1 wherein the product definition information includes a first product name and a second product name, wherein the naked product information includes a first naked product and a second naked product, and wherein the market research database further comprises:
   brand name information including a first brand name and a second brand name;
   business enterprise information including a first business enterprise and a second business enterprise; and,
   redefine information (i) linking the first and second product names with a product redefine date on which the first product name was changed to the second product name, (ii) linking the first and second naked products with a naked product redefine date on which the first naked product was changed to the second naked product, (iii) linking the first and second brand names with a brand name redefine date on which the first brand name was changed to the second brand name, and (iv) linking the first and second business enterprises with a business enterprise redefine date on which the first business enterprise was changed to the second business enterprise.

55. The market research database of claim 54 wherein the brand names are linked to naked products, and wherein business enterprises are linked to brand names.

56. The market research database of claim 1 wherein the product definition information includes a first product name and a second product name, wherein the industry code information includes a first industry code and a second industry code, and wherein the market research database further comprises:

brand name information including a first brand name and a second brand name;

business enterprise information including a first business enterprise and a second business enterprise; and, redefine information (i) linking the first and second product names with a product redefine date on which the first product name was changed to the second product name, (ii) linking the first and second industry codes with a code redefine date on which the first industry code was changed to the second industry code, (iii) linking the first and second brand names with a brand name redefine date on which the first brand name was changed to the second brand name, and (iv) linking the first and second business enterprises with a business enterprise redefine date on which the first business enterprise was changed to the second business enterprise.

57. The market research database of claim 56 wherein brand names are linked to naked products, and wherein business enterprises are linked to brand names.

58. The market research database of claim 1 further comprises:

brand name information including a first brand name and a second brand name;

business enterprise information including a first business enterprise and a second business enterprise; and, redefine information (i) linking the first and second brand names with a brand name redefine date on which the first brand name was changed to the second brand name, and (ii) linking the first and second business enterprises with a business enterprise redefine date on which the first business enterprise was changed to the second business enterprise.

59. The market research database of claim 58 wherein brand names are linked to naked products, and wherein business enterprises are linked to brand names.

60. The market research database of claim 1 wherein the product definition information includes a first product name and a second product name, and wherein the market research database further comprises:

brand name information including a first brand name and a second brand name;

business enterprise information including a first business enterprise and a second business enterprise; and, redefine information (i) linking the first and second product names with a product redefine date on which the first product name was changed to the second product name, (ii) linking the first and second brand names with a brand name redefine date on which the first brand name was changed to the second brand name, and (iii) linking the first and second business enterprises with a business enterprise redefine date on which the first business enterprise was changed to the second business enterprise.

61. The market research database of claim 60 wherein brand names are linked to naked products, and wherein business enterprises are linked to brand names.

62. A market research database comprising:

a first information set including information about products;

a second information set including information about brands;

a third information set including information about business enterprises; and, time related links between the first, second, and third information sets, the time related links being arranged to permit tracking of evolutionary relationships between the products, the brands, and the business enterprises.

63. A market research database comprising:

a first information set including brand information;

a second information set including business enterprise information; and, time related links between the first and second information sets, the time related links being arranged to permit tracking of evolutionary relationships between the brand information and the business enterprise information.

64. A market research database comprising:

a first information set including product definition information;

a second information set including naked product information;

a third information set including brand information;

a fourth information set including business enterprise information; and, time related links between the first, second, third, and fourth information sets, the time related links being arranged to permit tracking of evolutionary relationships between the product definition information, the naked product information, the brand information, and the business enterprise information.

* * * * *